Oct. 15, 1929.  P. THOMAS  1,731,952
SYNCHRONIZING RELAY SYSTEM
Filed Sept. 19, 1927
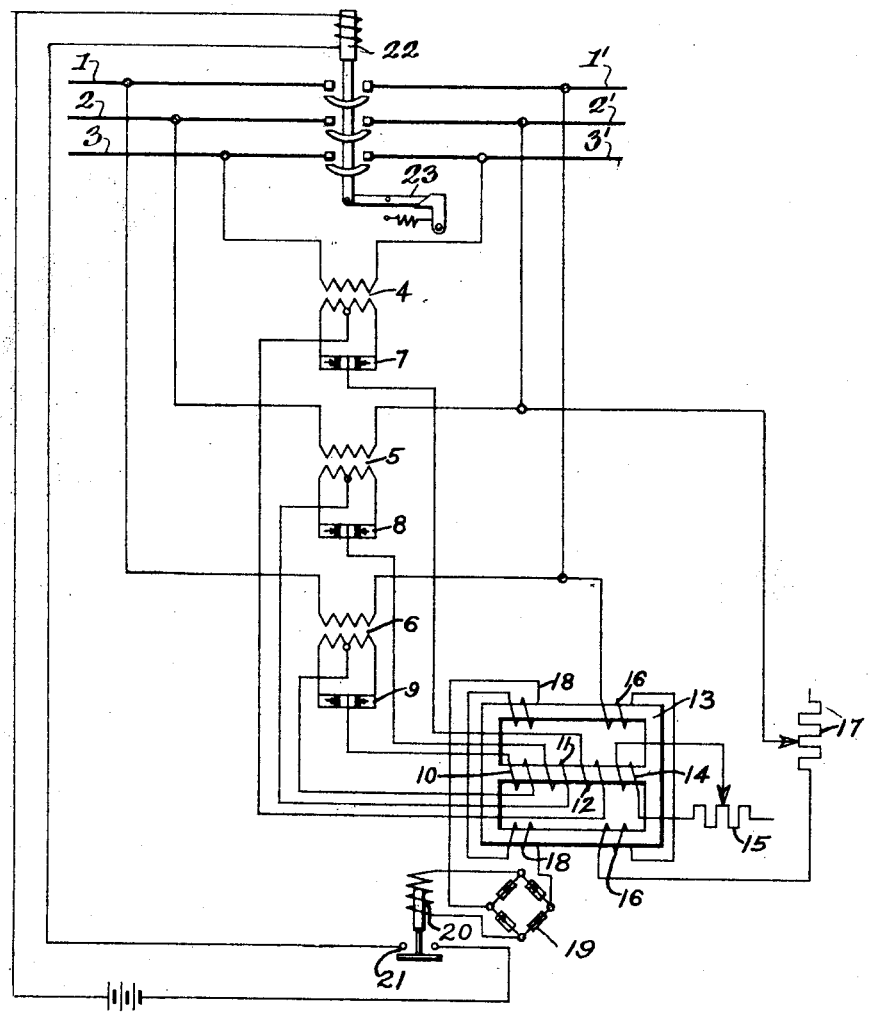
INVENTOR
*Phillips Thomas*
BY
*[signature]*
ATTORNEY Patented Oct. 15, 1929

1,731,952

UNITED STATES PATENT OFFICE

PHILLIPS THOMAS, OF EDGEWOOD, PENNSYLVANIA, ASSIGNOR TO WESTINGHOUSE ELECTRIC & MANUFACTURING COMPANY, A CORPORATION OF PENNSYLVANIA

SYNCHRONIZING RELAY SYSTEM

Application filed September 19, 1927. Serial No. 220,555.

This invention pertains to automatic synchronizing systems the purpose of which is to automatically parallel alternating current systems when suitable conditions obtain therein.

The principal object of my invention is to provide a device, without moving parts, to control the paralleling of polyphase alternating-current circuits when the voltages thereof are within a predetermined angle of synchronism.

A further object of my invention is to provide a paralleling system which shall be unaffected in operation by the opening of one or even two phases of one of the polyphase circuits paralleled.

A still further object of this invention is to provide a paralleling system which will serve to prevent paralleling unless the phase sequence in both polyphase circuits is the same.

In my copending applications Serial No. 221,490, filed September 23, 1927, and Serial No. 227,461, filed October 20, 1927, I have described several modifications of a paralleling system of my invention. The system of the present invention is based upon similar principles, but has additional functions which will be more fully described hereinafter. The invention may be more fully understood by reference to the accompanying drawing, the single figure of which is a diagram illustrating my automatic paralleling relay system.

I have indicated at 1, 2 and 3 and at 1', 2' and 3', two three-phase alternating-current circuits. Across the corresponding phases of the circuits are connected the primaries of transformers 4, 5 and 6, the secondaries of these transformers being connected to rectifiers 7, 8 and 9, which may be of any type, but which I have illustrated as copper oxide disc rectifiers.

At 13 is shown one of the three-legged transformers described in my applications above referred to. The transformer 13 is provided with a primary winding 16 connected, through a variable impedance 17, which I have illustrated as a resistance, to conductors corresponding to any phase of one of the circuits, for example, to conductors 1' and 2'. The secondary winding 18 of the transformer 13 is connected to a bridge rectifier 19 of the same type as that shown at 7. In addition to the primary and secondary windings, transformer 13 is also provided with direct-current windings 10, 11 and 12 on the central leg and also with a winding 14 which supplies a variable resistance 15. The windings 10, 11 and 12 are energized by the outputs of rectifiers 9, 8 and 7, respectively. The transformer 13 is so designed that the core may be saturated by direct-current in any one of the windings 10, 11 and 12.

The primary and secondary windings 16 and 18 of the transformer 13 are equally divided on the two outer legs of the core. As a result of this arrangement, the net alternating flux in the center leg is zero, and no alternating voltage is induced in the windings 10, 11 and 12.

The output of rectifier 19 is supplied to the operating coil of the switch 20 which, when energized, closes the contacts 21, which may be those of the paralleling switch or of a relay controlling a local circuit including the operating coil of the paralleling switch.

In the embodiment of my invention shown herein, the device 20 is the control relay for the paralleling switch 22. When the relay 20 is energized, a circuit is completed for the operating coil of the switch 22 which thereupon connects the circuits 1—2—3 and 1'—2'—3'. A latching mechanism 23 is provided to lock the switch 22 in the closed position, and any suitable means may be provided for releasing the latch to trip the switch 22.

As described in my copending applications above referred to, the secondary voltage of the transformer 13 is controlled by the energization of the direct-current windings on the central leg. As is obvious, the transformers 4, 5 and 6 are so connected as to have impressed upon them the resultants of the voltages of the corresponding phases of the circuits to be paralleled. As long as the voltages of the circuits are out of phase, the resultants of the various phase voltages will cause current to circulate in the direct-current windings 10, 11 and 12.

As is well known, the superposition of a unidirectional flux upon an alternating flux has the effect of reducing the reactance of the winding producing the alternating flux and, consequently, the voltage across the winding. This principle is made use of in the system described herein, and, as a result, as long as the voltages of the two circuits are out of phase, a current circulates in the direct-current windings of the transformer 13, and the voltage induced in the secondary winding 18 will be insufficient to operate switch 20.

When the voltages of the circuits have come into phase, however, the resultants of the phase voltages decrease to zero, and direct-current no longer flows through the windings 10, 11 and 12. Under these conditions, the reactance of the transformer 13 reaches its normal high value, and the voltage induced in the secondary winding 18 is correspondingly increased to a value which is sufficient to operate the switch 20 to cause paralleling of the polyphase circuits.

The function of the winding 14, which serves as a damping winding, is to prevent the secondary voltage from being affected immediately by the variations of the current in the windings 10, 11 and 12. The time delay is caused by the opposition offered by the damping winding to any change of conditions in the magnetic circuit of transformer 13. As a result, momentary synchronism of the alternating-current circuits will not cause the paralleling switch to be operated, and, furthermore, the voltage induced in the secondary winding 18 will not be sufficient to operate the switch 20 until the difference in the frequencies of the two circuits has been reduced sufficiently to make paralleling feasible.

From the above description of my invention and its operation, it is obvious that I have provided a system for automatically paralleling polyphase circuits when conditions therein are suitable. Since either of the windings 10, 11 and 12 will, when energized, saturate the core of the transformer 13, it is evident that false operation would not occur should either one or two of the phases of either source be open circuited. The remaining phase will cause the voltage of the transformer 13 to be reduced below the operative value of switch 20 at all times except when the two circuits are within a predetermined angle of synchronism.

Another obvious advantage of my invention is that, in case the phase sequence of one circuit should be reversed accidentally with respect to that of the other, paralleling would be prevented under all circumstances. This follows from the fact that when the phase sequence of one circuit is reversed, the resultants of all the phase voltages will never be reduced to zero under any conditions. It is necessary, as above explained, that the resultants of corresponding phase voltages all be reduced to zero before the system of my invention will cause paralleling to take place. It is apparent, therefore, that this system will prevent false operation in case of circuit failure, and also in case of phase reversal.

While I have shown and described a particular form of my invention, various changes and modifications may be made therein without departing from the spirit and scope thereof, as set forth in the appended claims.

I claim as my invention:

1. A system for automatically connecting alternating-current circuits comprising a connecting switch and a control relay therefor, a transformer for energizing said relay from one of said circuits, a saturating winding on said transformer, and means for energizing said saturating winding in accordance with the resultant of the voltages of corresponding phases of said circuits.

2. A system for automatically connecting polyphase alternating-current circuits comprising a switch for connecting said circuits, electro-magnetic means for operating said switch, and a relay for controlling said means, a transformer for energizing said relay from one of said circuits, direct-current means for decreasing the voltage of said transformer below the value required for operating said relay, means for energizing said voltage-decreasing means in proportion to the resultant of the voltages of the respective phases of the circuits, whereby connection of said circuits is prevented if the phases of either circuit are reversed or if the sources are not in synchronism, even though some of the phases of one circuit are open circuited.

3. A system for automatically connecting polyphase alternating-current circuits comprising a switch for connecting said circuits, a relay for controlling said switch, a transformer for energizing said relay, direct-current saturating windings on said transformer for controlling the voltage induced in the alternating-current windings thereof, means for energizing said direct-current windings in proportion to the resultant of the voltages of the various phases of the circuits, whereby the voltage induced in the alternating-current windings of said transformer is reduced below the operative value of the solenoid when the voltages of said circuits are substantially out of phase or when the phases of either circuit are reversed with respect to those of the other.

4. A system for automatically connecting polyphase alternating-current circuits comprising a switch for connecting said circuits, a relay for controlling said switch, a transformer for energizing said relay, direct-current windings on said transformer for controlling the voltage induced in the alternating-current windings thereof, rectifiers connected across the respective phases of said circuits for energizing said direct-current windings in proportion to the resultant of the voltages in the various phases of said circuits, whereby the voltage of said transformer is reduced to a value below that required for operating said solenoid so that the circuits will not be connected when substantially out of phase or when the phase sequence of either circuit is reversed with respect to that of the other.

5. A system for paralleling polyphase alternating-current circuits automatically, comprising a switch for connecting said circuits, a relay for controlling said switch, a transformer for energizing said relay, said transformer having its primary winding connected to one of said circuits and its secondary winding to said solenoid, said transformer having also direct-current saturating windings which, when energized, reduced the voltage induced in the secondary winding of said transformer below the value required for fully energizing said relay, means for energizing said direct-current windings in proportion to the resultants of the voltages of the phases of the circuits, and an additional winding on said transformer supplying a variable resistor and serving as a damping winding to prevent variations in the energization of said saturating windings from being immediately effective in varying the voltage impressed by the transformer on said solenoid.

In testimony whereof, I have hereunto subscribed my name this 12th day of September, 1927.

PHILLIPS THOMAS.